June 16, 1959  O. C. KARKALITS, JR., ET AL  2,891,094
NEW CATALYST FOR REDUCING NITROBENZENE AND THE PROCESS
OF REDUCING NITROBENZENE THEREOVER
Filed Feb. 17, 1955
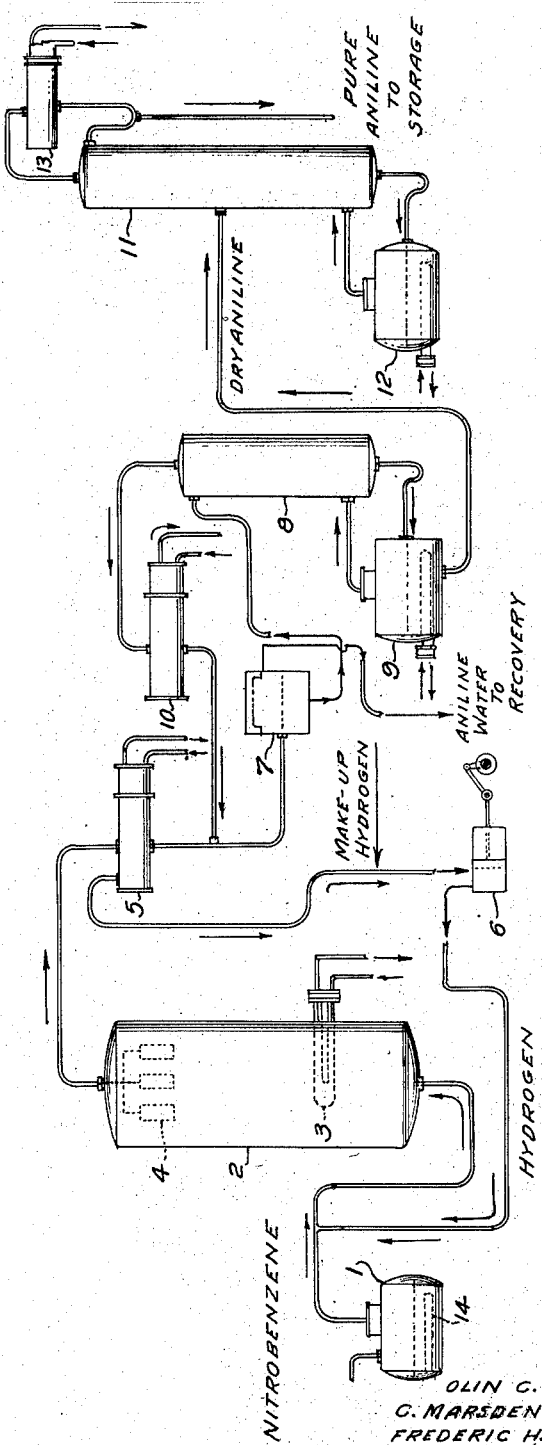
INVENTORS
OLIN C. KARKALITS, JR.,
C. MARSDEN VANDERWAART,
FREDERIC H. MEGSON,
BY Robert J. Kell ATTORNEY

United States Patent Office

2,891,094
Patented June 16, 1959

2,891,094

NEW CATALYST FOR REDUCING NITROBENZENE AND THE PROCESS OF REDUCING NITROBENZENE THEREOVER

Olin Carroll Karkalits, Jr., Plainfield, Cornelius Marsden Vanderwaart, Bedminster, and Frederic Houghton Megson, Middlesex, N.J., assignors to American Cyanamid Company, New York, N.Y., a corporation of Maine Application February 17, 1955, Serial No. 488,918

9 Claims. (Cl. 260—580)

This invention relates to a new catalyst for the reduction of nitrobenzene and the process of preparing it and to the process of producing aniline by the use of this catalyst. More specifically, it relates to a catalyst prepared by impregnation of silica hydrogel with a solution of cuprammonium compound followed by drying and calcining in a reducing atmosphere, and to the process of using this catalyst in the reduction of nitrobenzene to aniline.

The catalytic properties of copper and its salts in the reduction of aromatic nitro-compounds, the dehydration of alcohols, the oxidation of hydrocarbons and alcohols, the hydrogenation of double bonds, etc. have been known in the art for many years. Many catalysts have been described as useful for these purposes. Thus, it has been proposed, e.g., to use fused copper oxide, to prepare a gel of cupric chloride and sodium silicate, to deposit metallic copper on alumina, or to deposit a copper salt on a carrier such as pumice, asbestos, or kieselguhr.

These catalysts which have been described in the literature have serious disadvantages. One of these is that the conversion of nitrobenzene to aniline, when the former is passed over some of them in the presence of hydrogen, is not quantitative. Another disadvantage of some of the prior catalysts is difficulty of preparation. When a catalyst requires many steps and exacting conditions for its prepartion, the time, labor, and care which must be taken add greatly to its cost.

A more important disadvantage of the prior art catalysts is their life. Certain catalysts, especially those based on copper, are easily poisoned or are contaminated with tarry or carbonaceous deposits causing a loss of activity. When this occurs the catalytic operation must be stopped while the catalyst is "regenerated" by some treatment to restore its activity. We define the yield of product obtained before regeneration is required as the "initial life." While initial life is important, it is of greater importance that the catalyst be capable of repeated regenerations. We define as the "ultimate life" the total yield of product obtained before it becomes necessary to discard the catalyst. We have found by experimentation that catalysts of the prior art are not capable of such repeated regeneration in an economical manner and are therefore not usable to advantage in a large scale plant.

Still another disadvantage of the catalysts of the prior art is the inability to fluidize many of them. The recent development of the technique of fluid catalysts, i.e. catalysts which are finely divided and can be pumped around the production unit as if they were a fluid, has added a great deal to the economy of catalytic operations. These catalysts can be used in continuous operations and can be separated from the reaction mixtures by settling, filtration, or similar methods, for re-introduction into the feed. Such catalysts can be removed from the reaction chamber, regenerated and then returned to the reaction chamber. Many of the catalysts of the prior art cannot be prepared in a particle size suitable for fluid catalysts. Other catalysts lack the structural strength required of fluid catalysts.

We have found that a catalyst for the reduction of nitrobenzene can be prepared by impregnating a hydrogel of silicic acid with a solution of a cuprammonium compound, followed by filtering, washing, drying, and heating in a stream of hydrogen. A catalyst prepared by this process is a homogeneous dispersion of copper distributed through the silica carrier, with the copper well bonded to the carrier, so that it is not separable therefrom mechanically or by washing after impregnation. It is an advantage of this catalyst that its preparation is relatively simple to carry out. It gives a quantitative conversion to aniline when a mixture of nitrobenzene and hydrogen is passed over it. It is easily prepared as to a fluid catalyst without sacrifice of activity or life. Most important, it can be regenerated and has a much longer initial life and ultimate life than any known prior art catalyst.

In the preparation of our catalyst a hydrogel of silicic acid is formed by acidifying an aqueous solution of sodium silicate. This hydrogel is filtered and washed. A cuprammonium compound solution is then prepared and added to the hydrogel. After the solution of cuprammonium compound has been stirred in, the impregnated hydrogel is filtered, washed, and dried and the dry catalyst is calcined under hydrogen to convert the cuprammonium compound to copper while the silicic acid hydrogel is converted to silica gel.

The preparation of silica gel of large surface area is well known in the art, e.g. Tamele Byck, Ryland & Vinograd, "The Influence of Certain Variables on the Pore Structure of Silica Gel," 110th meeting of the American Chemical Society, Chicago, September 1946. It is affected by such factors as temperature of precipitation and drying, concentration of the reagents, pH of aging, and the like. These known data are applied in the preparation of our catalyst in order to obtain the maximum possible surface area by precipitating the hydrogel at a pH between 3 and 10.

The cuprammonium compound solution can be prepared in one of several ways. Any soluble salt of copper may be treated with an excess of ammonia until the initially precipitated basic copper salt is just redissolved. Alternatively the cuprammonium compound may be formed by treating a solution of the copper salt with an alkali metal hydroxide, to precipitate the copper hydroxide which is filtered, washed, and mixed with just enough ammonium hydroxide to dissolve it. The pH of the cuprammonium compound solution which is added to the silicic acid hydrogel is critical in attaining the long life which is one of the advantages of our catalyst. The solution should have a pH of between 8 and 12, preferably between 9 and 10. This is best achieved by using just enough ammonia to dissolve the copper salt completely. Too low a pH will leave large particles of copper salt agglomerated in the impregnated silica gel instead of being uniformly distributed while too high a pH will reduce the amount of the copper absorbed into the hydrogel, which is important. The presence of large amounts of base, especially of alkali metal bases, will destroy the catalyst by dissolving out silica.

The concentration of the cuprammonium compound solution appears not to affect the catalyst in itself. However, it is important that in the impregnation step, the ratio of copper present to the silica present in the silicic acid hydrogen be sufficient in order to introduce sufficient copper into the final catalyst. The amount of copper in the final catalyst has a large effect on the life of the catalyst, both initial and ultimate. It is necessary to have at least 5% copper in the final product in order to get the greatly increased life. In order to achieve this, it is necessary that the impregnation mixture contain at least 0.085 g. of copper per gram of $SiO_2$ present in the silicic acid hydrogel. The preferred copper content of the final catalyst, 10 to 20%, is achieved by using 0.1 to 0.5 grams of copper per gram of $SiO_2$ in the impregnation slurry.

The long life of our catalyst is dependent on other factors in the preparation. If, after impregnation, the catalyst is isolated by evaporating the slurry to dryness, or even by filtration without washing, the resulting catalyst is found to be unusable since it shows a tendency to decompose on heating. Furthermore, the surface area of such catalysts are very low. It is essential that the impregnation slurry be isolated and that the isolated gel be washed free of soluble copper (and other salts). The isolation may be by filtration or other common method.

The drying of the catalysts is usually carried out by spray-drying in the conventional manner. The spray-drying can be adjusted by those skilled in the art to give a product which is directly usable, after heating in a hydrogen atmosphere, as a fluid catalyst. We prefer a product whose particles are of the order of magnitude of 20 to 150 microns in diameter.

The dry catalyst is then calcined under hydrogen between 150 and 350° C., preferably at 250-300° C. This procedure converts the cuprammonium compound first to copper oxide and then to copper. At the same time the hydrogel of silicic acid is dehydrated to a silica gel. The resulting catalyst has a large surface area, a large pore volume, and a large average pore diameter and is sufficiently finely divided to flow like a fluid. We have found that, in order to achieve a long life, the catalyst must have the following physical measurements: The surface area must be greater than 200 square meters per gram, the pore volume must be above 0.25 cc. per gram and the average pore diameters must be above 20 Angstrom units. If a previously spray dried silica gel (thus one of large surface area) is slurried in a cuprammonium salt solution and its impregnation attempted by the rest of the procedure used above, it is found that the product's pore volume and pore diameter are both small and that as a catalyst, it has a very short life. Similarly, other variations of our procedure which have been described in the literature give catalysts which are outside the critical limits we have determined to be necessary for long life.

The production of aniline using this catalyst is effected by passing a mixture of hydrogen and nitrobenzene over the catalyst at reaction temperature. This may be any temperature between 150° C. and 350° C. but a preferred range is between 250° C. and 300° C.

Preparation of aniline from nitrobenzene in the presence of our catalyst will be better understood by reference to the drawing in which 1 is a nitrobenzene vaporizer; 2 is a reactor containing a fluidized catalyst bed; 3 is a heat interchange device for removing the exothermic heat of reaction; 4 are filters which prevent carryover of the fluid catalyst; 5 is a condenser; 6 is a compressor for hydrogen recycle; 7 is a gravity settler for the separation of aniline and water; 8 is a dehydrating column for the aniline; 9 is a re-boiler for the dehydrating column; 10 is a condenser for the dehydrating column; 11 is a column for purifying the aniline; 12 is a re-boiler for column 11; 13 is a condenser for column 11; and 14 is a heating element for the vaporizer 1.

In the manufacture of aniline by our process, the reactor 2 is first charged with our catalyst. It is convenient when preparing an active catalyst to carry out the reduction step in the reactor. Prior to admitting hydrogen, air must be purged from the system. This is done with an inert gas such as nitrogen or carbon dioxide to avoid a combustible mixture. The reduction is generally effected at 250° C. the necessary heat being supplied both by pre-heating the hydrogen and by the heat interchanger 3.

After the catalyst is reduced, nitrobenzene is fed to the vaporizer 1 by an automatic device guaranteeing a steady uniform rate of feed. The vaporizer 1 is heated by the heating element 14. A mixture of nitrobenzene from the vaporizer and an excess of hydrogen gas enter the reactor 2 together. The reacting gases which enter the reactor 2 can conveniently consist of approximately 10–20 mole percent nitrobenzene and 80–90 mole percent hydrogen.

The mixture of nitrobenzene vapor and hydrogen pass upward through a porous distributor plate into the reaction chamber, the catalyst powder being carried upward through the chamber by the flow of gases. The grid at the base of the reaction chamber is perforated with holes of such size and number as to provide a pressure drop of about 1 pound per square inch. This serves to distribute the gases across the catalyst bed and to provide jets of gas in the bed for gas-catalyst mixing. The holes in the grid must be large enough to prevent plugging by catalyst particles. The gases at reacting conditions (e.g. 20 pounds per square inch and 270° C.) have a density of about 60 percent that of air at standard conditions. The vapor velocity within the reactor 2 is approximately 1 foot per second.

The reduction of nitrobenzene is highly exothermic and heat-transfer liquid is circulated through interchanger 3 to remove excess heat of reaction. The diameter of the catalyst bed is determined by the production rate and the height of the catalyst bed will be sufficient to insure complete reaction and to obtain a sufficient volume of catalyst so that the regeneration in place need be carried out only at infrequent intervals. This will lead to a catalyst bed whose height is greater than its diameter. The upper portion of the reactor 2, essentially empty, acts as a disengaging zone and permits a major portion of the catalyst particles entrained in the gas stream to fall back into the bed. The exit gases are filtered free of catalyst on the porous stainless steel filters 4. The filtered gases are cooled in the condenser 5 which separates aniline and water from the excess hydrogen which is recycled to the reactor. The aniline is separated from water by settling in chamber 7, and wet aniline is passed through column 8. Then dry aniline from the bottom of column 8 is fractionated in column 11 to give a pure product of high quality. The water and aniline vapors which leave the top of the column 8 are condensed and returned to the settler 7.

The process described above produces aniline with a yield better than 99 percent of theory. Loss of catalytic activity over a period of time caused by deposition of organic material on the catalyst is accompanied by an appreciable amount of nitrobenzene in the condensed aniline. When nitrobenzene begins to appear in appreciable quantities in the condensed aniline it becomes necessary to regenerate the catalyst. This may be readily accomplished by stopping the nitrobenzene feed, flushing the system with an inert gas, and passing air through the catalyst at about 250°–350° C. The organic deposit is burned and it is probable that at least some part of the metallic copper is converted to an oxide. To avoid excess heat during the regeneration, an air-stream mixture is used initially. The regeneration is finished with air when only a small amount of the deposit remains and there can be only a low rate of heat release.

After regenerating the catalyst any copper oxide formed is reduced by flushing the system with an inert gas and reducing with hydrogen at about 250° C., a repetition of the step described above. The nitrobenzene feed is resumed and the cycle is repeated, as long as the catalyst is capable of giving essentially quantitative reduction of nitrobenzene to aniline.

Copper catalysts are, as is well known, easily poisoned by sulfur compounds. It is therefore preferable, in order to achieve the maximum life possible from the catalysts, to use nitrobenzene containing below 10 parts per million of nitrothiophene. Benzene synthesized from petroleum fractions is usually relatively thiophene-free. That from coal tar can be made so by known methods. For the same catalyst, the life of the catalyst will vary inversely with the amount of nitrothiophene in the nitrobenzene. A maximum of 10 p.p.m. permits an ultimate life greater than 600 grams of aniline per gram of catalyst.

It will be recognized that our process places certain limitations on the flow rate of the reaction mixture. If the gas flow is too slow, the catalyst will not be fluidized. If the gas flow is too fast, the reactants may be transported out of the reaction chamber before sufficient contact is obtained to assure quantitative reduction. The linear rate of gas flow should be within 0.1 and 5 ft. per second with sufficient catalyst present to give a contact time between 0.5 and 100 seconds.

This application is a continuation-in-part of our copending application, Serial No. 400,008, filed December 23, 1953, now abandoned.

Our invention can be further illustrated by the following examples in which parts are by weight unless otherwise specified.

EXAMPLE 1

Seven hundred and ninety-two parts of water is mixed with 216 parts of a solution of sodium silicate which contains 28.5% $SiO_2$ and 8.85% $Na_2O$. Four thousand parts of 25% sulfuric acid is then added slowly with agitation until the hydrogel has formed. The hydrogel is stirred slowly and allowed to age for 45 minutes and then is diluted with 280 parts of water and a trace of animal glue. The product is then filtered and washed free of sulfate ion. Forty-two and one-half parts of copper nitrate trihydrate is dissolved in 600 parts of water and clarified by filtration. One hundred and sixty-five parts of 10% sodium hydroxide solution is added with agitation below 15° C. The precipitated copper hydroxide is filtered and washed until the cake has a pH of less than 10. This cake is then added to 830 parts of 29% ammonium hydroxide. The solution which forms is stirred for 30 minutes and then clarified by filtration. It is then added to the hydrogel formed above and the mixture is stirred until a thorough mixture is obtained. It is then filtered and washed. The filter cake is dried to give 56 parts of dry powder. This product is then heated in a stream of hydrogen at a temperature of 260°–270° C. until reduction is complete. The use of this catalyst in our process is described in Example 8 below.

EXAMPLE 2

A silica hydrogel is made by adding 198 parts of water to 54 parts of sodium silicate solution (28.5% $SiO_2$) and then adding 975 parts of 25% sulfuric acid. After stirring 45 minutes, an additional 70 parts of water and one part of 8% animal glue is added. The hydrogel is filtered and washed.

Four hundred and eighty-three parts of cupric nitrate trihydrate and 3,000 parts of water are mixed with 530 parts of 29% aqueous ammonia. To this is added 1790 parts of hydrogel containing 15–16% solids and 57 parts aqueous ammonia. The mixture is stirred 17 hours, followed by filtration and washing to a colorless filtrate. The wet cake is spray-dried and then heated with hydrogen in the usual manner. The use of this catalyst in our process is described in Example 8 below.

EXAMPLE 3

A silica hydrogel is prepared by adding 2376 parts of water to 648 parts of sodium silicate solution (28.5% $SiO_2$) and then adding 347 parts of 25% sulfuric acid. The mixture is stirred about one hour and 840 parts more of water is added. The hydrogel is filtered and washed.

One hundred twenty-eight parts of $Cu(NO_3)_2 \cdot 3H_2O$ is dissolved in 1200 parts of water and 103.5 parts of 28% aqueous ammonia is added. To this is added the wet hydrogel prepared above. The mixture is stirred 4 hours, followed by filtration and washing. The wet cake is spray-dried and heated with hydrogen in the usual manner. The use of this catalyst in our process is described in Example 8 below.

EXAMPLE 4

The procedure of Example 3 is followed except that after the stirring of the mixture of hydrogel and cuprammonium solution, the mixture is divided into three parts.

Part A is spray-dried just as it is, without any decantation filtration, or washing.

Part B is filtered and, without washing, the filter cake is spray-dried.

Part C is filtered and washed as in Example 3, followed by spray-drying.

The use of these catalysts in our process is described in Example 8 below.

EXAMPLE 5

One hundred and seventy-eight parts of a solution of sodium silicate containing 29.3% $SiO_2$ and 9.1 $Na_2O$ is diluted with 880 parts of water. Five hundred parts of 5% sulfuric acid is added until a hydrogel is formed. Forty parts of copper nitrate trihydrate is dissolved in 200 parts of water and the solution is clarified by filtration. The hydrogel is added and the mixture is stirred until mixing is complete. The slurry is filtered and the filter cake is dried 24 hours at 110° C. followed by 24 hours at 125° C. giving 74.8 parts of dry powder. This was further dried for 24 hours at 200° C. after which it was heated under a stream of nitrogen slowly to 375° C. where brown fumes of nitrogen dioxide were observed. The heating was continued and the temperature was slowly raised to 450° C. where it was held for 24 hours. It was then slowly raised to 620° C. The product was then reduced in a stream of hydrogen at 250–300° C. until reaction was complete. The above example did not involve the preparation of a cuprammonium compound and was not a satisfactory catalyst for use in our process as will be shown in Example 8 below.

EXAMPLE 6

The following example is given to illustrate a catalyst described in the prior art. Five hundred parts of copper sulfate pentahydrate is dissolved in 750 parts of water. One hundred and twenty-five parts of powdered volcanic ash (pumice) is added and the slurry is heated to the boil for 2 hours, concentrating it approximately half its original volume. The slurry is then allowed to cool and is added to 2,000 parts of 5% sodium hydroxide solution. The mixture is stirred until complete mixing is obtained. The slurry is allowed to settle and the supernatant liquor is decanted. The product is then filtered and the solids are added to a solution containing 29.3% $SiO_2$, 9.1% $Na_2O$ with 400 parts of water. This slurry is stirred for 1 hour and filtered. The wet filter cake is then added to a calcium nitrate solution consisting of 50 parts of calcium nitrate tetrahydrate and 100 parts of water. The mixture is stirred for 2 hours and filtered. The cake is washed free of nitrate ion and dried in an oven giving 327 parts of a dry product containing 30.8% copper and 7.25% calcium silicate. The product is then reduced in a stream of hydrogen at 250–300° C. until the reaction is complete. This catalyst had a very short life as demonstrated in Example 8 below.

EXAMPLE 7

Example 2 of U.S. 1,207,802 was followed exactly by preparing a paste of 325 parts of pumice powder, 50 parts of sodium silicate solution containing 29.3% $SiO_2$ and 9.1 $Na_2O$, 60.8 parts of basic copper carbonate and 6.8 parts of zinc carbonate with 200 parts of water. After stirring thoroughly the mixture was dried overnight at 150° C., broken up to a loose powder and redried overnight at the same temperature. The product was 404 parts of gray-green solid. The effectiveness of this catalyst in the reduction of nitrobenzene is summarized in the following example.

EXAMPLE 8

The catalysts prepared in Examples 1 through 7 were tested for their effectiveness in the vapor phase reduction of nitrobenzene to aniline by the process described above. The results are summarized below in Table I. The ultimate life was calculated by dividing the sum of all the parts of nitrobenzene converted into aniline by the parts of catalyst used.

*Table I*

| Catalyst | Percent Cu | Surface Area, m.²/g. | Pore Volume, cc./g. | Avg. Pore Diameter, A. | Life Based on Catalyst Weight | | Life Based on Real Cu | |
|---|---|---|---|---|---|---|---|---|
| | | | | | Initial | Ultimate | Initial | Ultimate |
| Ex. 1 | 9.5 | 272 | 0.90 | 132 | 119 | 443 | 1,250 | 4,650 |
| Ex. 2 | 16.1 | 260 | 0.78 | 120 | 568 | 1,015 | 3,530 | 6,300 |
| Ex. 3 | 12.05 | 405 | 0.79 | 78 | 800 | (1) | 6,640 | (1) |
| Ex. 4A | 24.4 | 66 | 0.10 | 61 | (2) | (2) | (2) | (2) |
| Ex. 4B | 25.7 | 47 | 0.08 | 58 | (2) | (2) | (2) | (2) |
| Ex. 4C | 13.8 | 344 | 0.47 | 55 | 1,380 | (1) | 10,000 | (1) |
| Ex. 5 | 6.4 | 75 | 0.13 | 69 | (3) | (3) | (3) | (3) |
| Ex. 6 | 30.8 | 46 | (1) | (1) | 55 | 263 | 178 | 850 |
| Ex. 7 | 8.7 | 2.9 | 0.012 | 165 | 15 | 19 | 172 | 218 |

Notes:
1 Not determined.
2 These catalysts decomposed when heated for the calcining and could not be used.
3 No life data were obtained, since the conversion to aniline over this catalyst was far from quantitative at the beginning.

We claim:
1. In a process for the manufacture of aniline by continuous vapor phase reduction of nitrobenzene which comprises vaporizing nitrobenzene, contacting a mixture of the vapor and an excess of hydrogen with a copper catalyst, the said mixture of nitrobenzene and hydrogen being passed upward through said copper catalyst at such a rate that the catalyst particles assume a condition resembling those of a liquid in their flow properties and are displaced laterally through a converter, and separating the aniline from associated water vapor; the improvement which comprises using as said catalyst a copper catalyst prepared by impregnating a hydrogel of silicic acid, said hydrogel being prepared by precipitating silicic acid at a pH between 3 and 10, with a copper ammonium complex cation in solution, said solution having a pH between 8 and 12, there being present in the impregnation mixture at least 0.085 part of copper per part of silica, isolating the impregnated hydrogel, washing and drying said hydrogel, and reducing the dried product at 150–350° C. under an atmosphere of hydrogen; said catalyst being characterized by a flow property resembling those of a liquid, a copper content of at least 5% by weight, a surface area of at least 200 square meters per gram, a pore volume above 0.25 cubic centimeter per gram, and pore diameters of at least 20 Angstrom units.

2. The process of claim 1 in which the temperature of the reduction is kept at about 250 to 300° C. and the hydrogen is recycled.

3. The process of claim 1 in which the said mixture of nitrobenzene vapor and an excess of hydrogen is contacted with the said catalyst in a reaction zone maintained at a temperature in the range of 250° to 300° C. by means of a heat inter-changer and the excess hydrogen gas is recycled to the reaction zone.

4. A process of preparing a copper catalyst useful in the reduction of nitroaromatic compounds which comprises the following steps in sequence, (1) impregnating a hydrogel of silicic acid, said hydrogel being prepared by precipitating silicic acid at a pH between 3 and 10, with a copper ammonium complex cation in solution, said solution having a pH between 8 and 12, there being present in the impregnation mixture at least 0.085 part of copper per part of silica; (2) isolating the impregnated hydrogel; (3) washing and (4) drying said hydrogel; and (5) reducing the dried product at 150–350° C. under an atmosphere of hydrogen.

5. The process of claim 4 in which the impregnation mixture contains at least 0.1 but not more than 0.5 part of copper per $SiO_2$.

6. The process of claim 5 in which the pH of the solution of copper ammonium complex is between 9 and 10.

7. The process of claim 6 in which the reduction temperature is between 250° C. and 300° C.

8. The process of claim 7 in which the copper ammonium complex solution was prepared by dissolving cupric nitrate in just enough excess aqueous ammonia to effect complete solution.

9. A copper catalyst prepared by the process of claim 4; said catalyst being characterized by flow properties resembling those of a liquid, a copper content of at least 5% by weight, a surface area of at least 200 square meters per gram, a pore volume above 0.25 cubic centimeter per gram, and pore diameters of at least 20 Angstrom units.

References Cited in the file of this patent

UNITED STATES PATENTS

| | | |
|---|---|---|
| 1,124,776 | Marwedel | Jan. 12, 1915 |
| 1,207,802 | Schmidt | Dec. 12, 1916 |
| 1,876,009 | Krauch et al. | Sept. 9, 1932 |
| 1,937,728 | Storch | Dec. 5, 1933 |
| 1,971,656 | Perkins et al. | Aug. 28, 1934 |
| 2,034,077 | Arnold et al. | Mar. 17, 1936 |
| 2,258,786 | Melaven | Oct. 14, 1941 |
| 2,289,924 | Morrell et al. | July 14, 1942 |
| 2,402,440 | Owen | June 18, 1946 |
| 2,449,891 | Gary et al. | Sept. 21, 1948 |
| 2,517,223 | Mantell | Aug. 1, 1950 |
| 2,734,873 | Pitwell et al. | Feb. 14, 1956 |